United States Patent
Lopez Serrano et al.

(10) Patent No.: US 11,438,879 B2
(45) Date of Patent: Sep. 6, 2022

(54) METHOD OF ENABLING A STANDALONE TRAFFIC DETECTION FUNCTION, TDF, NODE IN A TELECOMMUNICATION NETWORK TO ACT ON UNSUCCESSFUL RESOURCE ALLOCATION FOR AN OVER-THE-TOP, OTT APPLICATION

(71) Applicant: Telefonaktiebolaget LM Ericsson (publ), Stockholm (SE)

(72) Inventors: Miguel Angel Lopez Serrano, Madrid (ES); Leticia Ruiz Martin, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 16/977,498

(22) PCT Filed: Mar. 28, 2018

(86) PCT No.: PCT/EP2018/057879
§ 371 (c)(1),
(2) Date: Sep. 2, 2020

(87) PCT Pub. No.: WO2019/170257
PCT Pub. Date: Sep. 12, 2019

(65) Prior Publication Data
US 2021/0058904 A1  Feb. 25, 2021

(30) Foreign Application Priority Data
Mar. 5, 2018  (EP) ..................... 18382135

(51) Int. Cl.
*H04W 72/04*  (2009.01)
*H04W 76/10*  (2018.01)
(Continued)

(52) U.S. Cl.
CPC .......... *H04W 72/04* (2013.01); *H04L 47/745* (2013.01); *H04M 15/66* (2013.01); *H04W 76/10* (2018.02)

(58) Field of Classification Search
CPC .... H04W 72/04; H04W 76/10; H04L 47/745; H04L 43/0817; H04L 41/5019; H04M 15/66
See application file for complete search history.

(56) References Cited

U.S. PATENT DOCUMENTS

2012/0320801 A1  12/2012  Yang et al.
2013/0316673 A1  11/2013  Goldner
(Continued)

OTHER PUBLICATIONS

3GPP TS 29.214 V15.2.0 (Dec. 2017).*

*Primary Examiner* — Jae Y Lee
(74) *Attorney, Agent, or Firm* — Murphy, Bilak & Homiller, PLLC

(57) ABSTRACT

A method of enabling a standalone Traffic Detection Function, TDF, node (104, 204, 304) in a telecommunication network to act on unsuccessful resource allocation for an over-the-top, OTT, application detected by said TDF node (104, 204, 304), said method comprising the steps of receiving (107), by a Policy and Charging Rules Function, PCRF, node (103, 203, 303) from said TDF node (104, 204, 304), a notification that said TDF node (104, 204, 304) has detected a particular OTT application; determining (108; 109), by said PCRF node (103, 203, 303), that resources for said detected particular OTT application can not be successfully allocated, and notifying (110), by said PCRF node (103, 203, 303), said TDF node (104, 204, 304) that said resources for said detected particular OTT application can not be successfully allocated.

12 Claims, 5 Drawing Sheets

(51) Int. Cl.
*H04L 47/74* (2022.01)
*H04M 15/00* (2006.01)

(56) References Cited

U.S. PATENT DOCUMENTS

| | | | |
|---|---|---|---|
| 2014/0317300 A1* | 10/2014 | Ludwig | H04W 76/34 |
| | | | 709/226 |
| 2017/0325120 A1 | 11/2017 | Szilagyi et al. | |
| 2019/0238350 A1* | 8/2019 | Zhou | H04W 28/24 |

* cited by examiner

METHOD OF ENABLING A STANDALONE TRAFFIC DETECTION FUNCTION, TDF, NODE IN A TELECOMMUNICATION NETWORK TO ACT ON UNSUCCESSFUL RESOURCE ALLOCATION FOR AN OVER-THE-TOP, OTT APPLICATION

TECHNICAL FIELD

The present disclosure relates to over-the-top applications, more specifically to the collaboration between the Policy and Charging Enforcement Function, PCEF, node and the Traffic Detection Function, TDF, node in a telecommunication network.

BACKGROUND

At present, a Policy and Charging Rules Function, PCRF, node is the functional element that encompasses policy control decision and flow based charging control functionalities. It provides network and gating control, and manages the flow based charging.

A Gx reference point is located between the Policy Control and Charging Rules Function, PCRF, node and a Policy and Charging Enforcement Function, PCEF, node. The Gx reference point is used for provisioning and removal of Policy and Charging Control, PCC, rules from the PCRF node to the PCEF node and the transmission of traffic plane events from the PCEF node to the PCRF node. The Gx reference point can be used for charging control, policy control or both by applying Attribute Value Pairs, AVPs, relevant to the application.

Via the Diameter Gx interface, using Policy and Charging Control, PCC, rules, the PCRF node may thus instruct the PCEF node regarding the treatment of each service data flow.

Service traffic detection mechanisms help to achieve service awareness. Traffic detection functionality and corresponding notification can be implemented by a Traffic Detection Function, TDF, node over a Diameter Sd interface, as a standalone entity, as well as be collocated with PCEF over Diameter Gx interface. The present disclosure is focused on the fact that the TDF node is a standalone entity. The above described feature was standardized in 3GPP Rel-11 and comprises the request to detect the specified application traffic, reporting to the PCRF node and application of specified enforcement actions. Both solicited and unsolicited application reporting models to the PCRF node are possible.

The present disclosure is directed to Over The Top, OTT, applications. OTT refers to the services you use over the network services of your service provider. A Voice over IP service may be an example of an OTT application as it is a service that is provided over the network services of your telecommunications provider, for example a 4G network.

Based on the OTT applications notifications received from the TDF node over the Sd interface, the PCRF node may be instructed to create dedicated bearers in the PCEF node, based on the flow information included within the notifications received from the TDF node, according to the Quality of Service, QoS, the OTT application requires for an improved user experience. The PCEF node notifies the PCRF node about the outcome of the establishment of the dedicated bearers.

In this scenario both, the PCEF node and the TDF node, can do enforcement at service level while charging can be done in the PCEF node or the TDF node, but usually not in both simultaneously.

With existing solutions, in those scenarios where the PCEF node cannot allocate the desired resources for OTT applications, the TDF node could apply to the OTT reported application enforcement and charging not aligned with the quality of service provided to the end user for a specific service.

Another issue with existing solution is regarding the scenario where the PCRF node cannot properly identify and qualify the notifications received from the TDF node. This would result in a same, or similar, issue as described above.

SUMMARY

It is an object of the present disclosure to provide for a method of enabling a standalone Traffic Detection Function, TDF, node in a telecommunication network to act on unsuccessful resource allocation for an over-the-top, OTT, application.

It is another object to provide for a Policy and Charging Rules Function, PCRF, node arranged for enabling a standalone Traffic Detection Function, TDF, node in a telecommunication network to act on unsuccessful resource allocation for an over-the-top, OTT, application.

Further objects relate to the Traffic Detection Function, TDF, node as well as a corresponding computer program product.

In a first aspect, there is provided a method of enabling a standalone Traffic Detection Function, TDF, node in a telecommunication network to act on unsuccessful resource allocation for an over-the-top, OTT, application detected by said TDF.

The method comprising the steps of:
receiving, by a Policy and Charging Rules Function, PCRF, node from said TDF node, a notification that said TDF node has detected a particular OTT application;
determining, by said PCRF node, that resources for said detected particular OTT application can not be successfully allocated;
notifying, by said PCRF node, said TDF node that said resources for said detected particular OTT application can not be successfully allocated.

The basic concept of the present disclosure is that the PCRF node notifies the TDF node that resources for the detected particular OTT application can not be successfully allocated. This would allow the TDF node to take appropriate actions. For example, the TDF node can then retry and sent a new notification to the PCRF node that a particular OTT application was detected.

The above is valid for a standalone TDF node. That is, the functionality of the TDF node is not implemented in the same node as the functionality of the PCEF node. As such, the PCEF node communicates directly to the PCRF node and the PCRF node communicates directly to the TDF node.

In accordance with the present disclosure, a PCRF node is a node which may function in real-time to determine policy rules in a multimedia network. As a policy tool, the PCRF node may play a central role in next-generation networks. It is a component that operates at the network core and accesses subscriber databases and other specialized functions, such as a charging system, in a centralized manner.

The PCRF node may be the part of the network architecture that aggregates information to and from the network, operational support system and other sources in real time, supporting the creation of rules and then automatically making policy decisions for each subscriber active on the network. Such a network might offer multiple services, quality of services, QoS, levels, and charging rules.

In an example, the step of determining comprises any of:
  unable to identify, by said PCRF node, said detected particular OTT application at said PCRF node;
  unable to generate, by said PCRF node, Policy Control and Charging, PCC, rules for said detected particular OTT application, which PCC rules are to be provided to a Policy and Charging Enforcement Function, PCEF, node comprised by said telecommunication network.

The inventors have found that resources for the detected particular OTT application may not be successfully identified in the PCRF node or allocated in a Policy and Charging Enforcement Function, PCEF, node.

That is, the PCRF node may, for example, be unable to identify the detected particular OTT application. This could mean that the PCRF node can not identify identifications, ID's, or other type of information that was originally present in the notification that was received by the PCRF node.

The PCEF node may, for example not be able to generate PCC rules for the detected particular OTT application, which is also considered that the resources for the detected particular OTT application are not successfully allocated.

In a further example, the step of determining comprises:
  generating, by said PCRF node, Policy Control and Charging, PCC, rules for said detected particular OTT application;
  providing, by said PCRF node, said PCC rules to a Policy and Charging Enforcement Function, PCEF, node comprised by said telecommunication network;
  receiving, by said PCRF node, from said PCEF node, a notification of a release or unsuccessful resource allocation for the OTT application by said PCEF node.

The above described embodiment describes a detailed example of an unsuccessful resource allocation at the PCEF. That is, the PCRF node may generated PCC rules for the detected OTT application, and may provide these PCC rules to the PCEF node. Usually, the resources are correctly allocated for the OTT application by the PCEF node. However, the present scenario describes that the PCEF node has released resources or has unsuccessfully allocated resources for the OTT application by the PCEF node.

In a further example, the method further comprises the step of:
  receiving, by said PCRF node, a subscription request from said TDF node for being notified with respect to a status of said resource allocation for said detected particular OTT application;
  wherein said step of notifying is performed based on said received subscription request.

The advantage of the embodiment described above is that a TDF node may decide itself whether it desired to be notified on the outcome of the resource allocation for the detected OTT application. More specifically, the embodiment describes the situation in which the PCRF node receives a subscription request from the TDF node for being notified with respect to a status of the resource allocation for the detected particular OTT application. The PCRF node will then notify the TDF node only if the TDF node has subscribed thereto.

The above would be advantageous as this would increase the compatibility of already existing TDF nodes in the field.

These TDF nodes do not necessary be updated in accordance with the method of the present disclosure. As such, the TDF nodes that are able to cope with the method in accordance with the present disclosure may be deployed in parallel in the same telecommunication network.

In a further example, the method comprises the initial steps of:
  engaging, by said PCRF node, an Internet Protocol, IP, Connectivity Access Network, IP-CAN Bearer Establishment procedure with a Policy and Charging Enforcement Function, PCEF, node comprised by said telecommunication network;
  initiating, by said PCRF node, a TDF node session establishment procedure for directly communicating with said TDF node.

The TDF node session establishment procedure may be, for example, directed to the Sd Interface application. Such a Sd interface application may provide for the provisioning of Application Detection and Control, ADC, rules from the PCRF node for the purpose of traffic detection and enforcement at the TDF node, and may provide for usage monitoring control of TDF node sessions and of detected application, and may provide for the reporting of the start and/or stop of a detected application's traffic.

The IP-CAN Bearer Establishment procedure may, for example, be directed to the Gx interface. Such a bearer establishment procedure may be initiated by the PCEF node, and any subsequent communications may be communicated over the Gx interface.

In a second aspect of the present disclosure, there is provided a Policy and Charging Rules Function, PCRF, node arranged for enabling a standalone Traffic Detection Function, TDF, node in a telecommunication network to act on unsuccessful resource allocation for an over-the-top, OTT, application detected by said TDF.

The PCRF node comprising:
  receive equipment arranged for receiving a notification that said TDF node has detected a particular OTT application;
  process equipment arranged for determining that resources for said detected particular OTT application can not be successfully allocated;
  notify equipment arranged for notifying said TDF node that said resources for said detected particular OTT application can not be successfully allocated.

The advantages of the first aspect of the disclosure are also inherently a part of the second aspect of the disclosure. Furthermore, it is pointed out that although the claims read as if all the equipment according to the present disclosure are incorporated into a single node, a person skilled in the art understands that the same disclosure may be implemented by distributing the equipment over several nodes, for example like a cloud-based solution.

In accordance with the present disclosure, equipment may also be interpreted as a module, device, means or anything alike.

In an example, the process equipment is further arranged for:
  unable to identify said detected particular OTT application at said PCRF node;
  unable to generate Policy Control and Charging, PCC, rules for said detected particular OTT application, which PCC rules are to be provided to a Policy and Charging Enforcement Function, PCEF, node comprised by said telecommunication network.

In accordance with the present disclosure, a policy and charging control, PCC, rule defines the treatment to be applied to packets associated with specific applications or to specific service data flows.

Two types of rules may exist, predefined PCC rules and dynamic PCC rules. The above described example is directed to dynamic PCC rules, in which the PCRF node is responsible for creating a specific PCC rule and for providing that particular PCC rule to the PCEF node.

In an example, the process equipment is further arranged for:
- generating Policy Control and Charging, PCC, rules for said detected particular OTT application;
- providing said PCC rules to a Policy and Charging Enforcement Function, PCEF, node comprised by said telecommunication network;
- receiving from said PCEF node, a notification of a release or unsuccessful resource allocation for the OTT application by said PCEF node.

In a further example, the receive equipment is further arranged for:
- receiving a subscription request from said TDF node for being notified with respect to a status of said resource allocation for said detected particular OTT application;

wherein said notify equipment is further arranged for notifying based on said received subscription request.

In yet another example, the PCRF node further comprises:
- engaging an Internet Protocol, IP, Connectivity Access Network, IP-CAN Bearer Establishment procedure with a Policy and Charging Enforcement Function, PCEF, node comprised by said telecommunication network;
- initiate equipment arranged for initiating a TDF node session establishment procedure for directly communicating with said TDF node.

In a third aspect, there is provided a method of enabling a standalone Traffic Detection Function, TDF, node in a telecommunication network to act on unsuccessful resource allocation for an over-the-top, OTT, application detected by said TDF.

The method comprising the steps of:
- transmitting, to a Policy and Charging Rules Function, PCRF, node from said TDF node, a notification that said TDF node has detected a particular OTT application;
- receiving, by said TDF node, from said PCRF node a notification that said resources for said detected particular OTT application can not be successfully allocated;
- retrying, by said TDF node, said transmitting of said notification that said TDF node has detected a particular OTT application based on said received notification.

The advantages of the first and second aspect of the disclosure are also inherently a part of the third aspect of the disclosure. Furthermore, it is pointed out that although the claims read as if all the equipment according to the present disclosure are incorporated into a single node, a person skilled in the art understands that the same disclosure may be implemented by distributing the equipment over several nodes, for example like a cloud-based solution.

In a fourth aspect, there is provided a Traffic Detection Function, TDF, node arranged for operating in a telecommunication network to act on unsuccessful resource allocation for an over-the-top, OTT, application detected by said TDF.

The TDF node comprising:
- transmit equipment arranged for transmitting, to a Policy and Charging Rules Function, PCRF, node a notification that said TDF node has detected a particular OTT application;
- receive equipment arranged for receiving from said PCRF node a notification that said resources for said detected particular OTT application can not be successfully allocated;
- retry equipment arranged for retrying said transmitting of said notification that said TDF node has detected a particular OTT application based on said received notification.

The advantages of the first, second and third aspect of the disclosure are also inherently a part of the fourth aspect of the disclosure. Furthermore, it is pointed out that although the claims read as if all the equipment according to the present disclosure are incorporated into a single node, a person skilled in the art understands that the same disclosure may be implemented by distributing the equipment over several nodes, for example like a cloud-based solution.

In a fifth aspect, there is provided a computer program product comprising computer program code which, when executed by a computer, cause the computer to implement the method according to any of the methods as disclosed above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
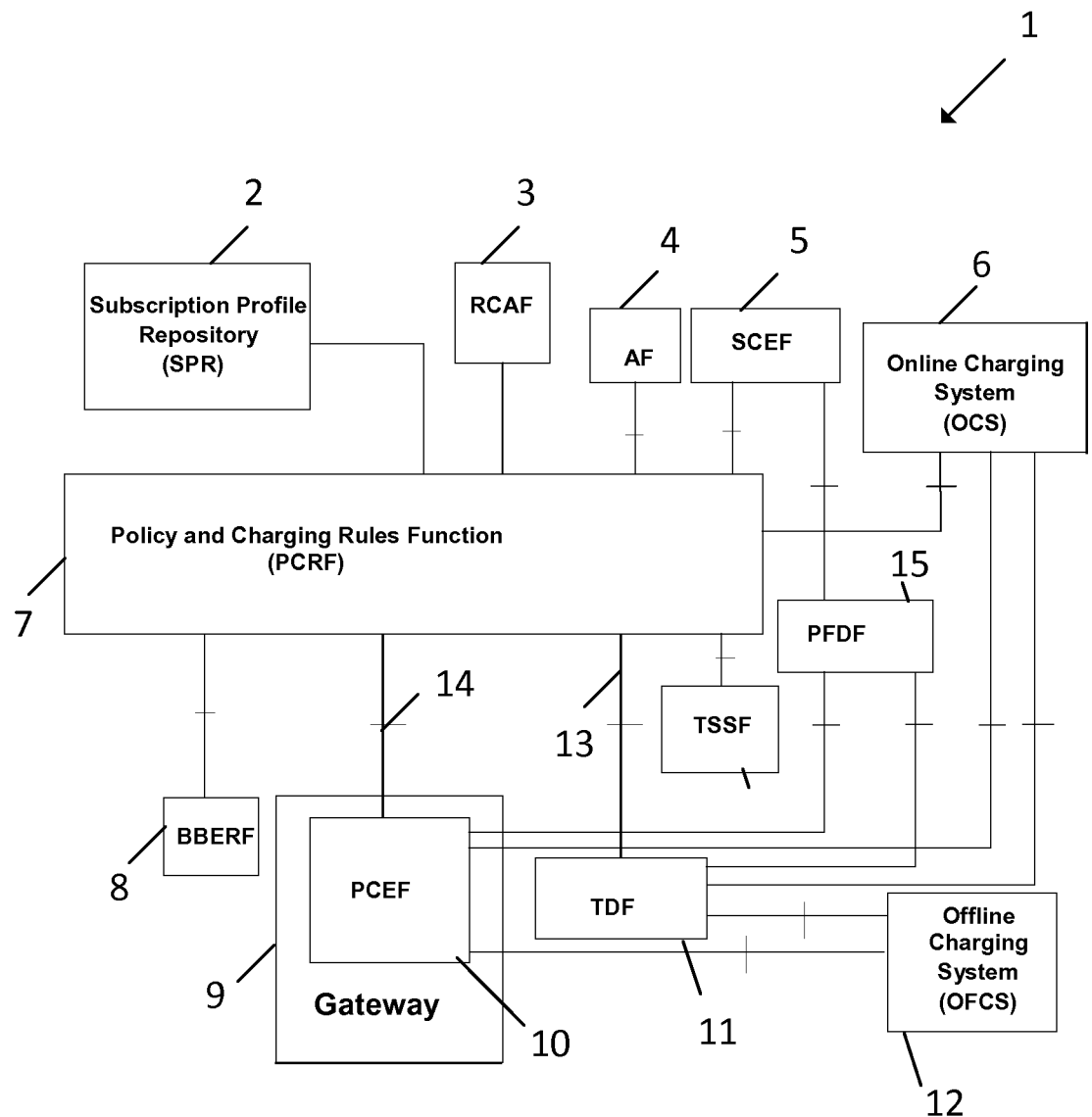
FIG. 1 discloses an architecture of a telecommunication network in accordance with the prior art.

FIG. 1 discloses an architecture 1 of a telecommunication network in accordance with the prior art.

The telecommunication network comprises a subscription profile repository, SPR, 2, a Radio Congestion Awareness Function, RCAF, 3, an Application Function, AF, 4, a Service Capability Exposure Function, SCEF, 5, an Online Charging System, OCS, 6 a Policy and Charging Rules Function, PCRF, 7, a Bearer Binding and Event Reporting Function, BBERF, 8, a gateway 9, a Policy and Charging Enforcement Function, PCEF, 10, a Traffic Detection Function, TDF, node 11, an Offline Charging System, OFCS, 12, a Packet Flow Description Function 15 and a Traffic Steering Support Function, TSSF, 16.

It is trusted that a person skilled in the art is aware of the above described nodes/servers and their functionality such that the above described nodes/servers are not explained in further detail here below.

It is clear from the architecture 1 shown in FIG. 1 that the PCEF node 10 may be integrated in a gateway 9, for example a Packet Gateway. The PCEF may also be integrated in other node of the telecommunication network, preferably in a node close to the edge of the network, for example close to the gateway.

It is further indicated that the TDF node 11 is a separate entity, i.e. a node which is not combined with the PCEF 10 into a single node. As such, there is no direct communication between the TDF node 11 and the PCEF node 10. The communication between the TDF node 11 and the PCEF node 10 flows, in accordance with the present invention, via the PCRF node 7, which will be explained in more detail here below.

It is noted that, currently, an Sd interface 13 is to be established between the TDF node 11 and the PCRF node 7 for communicating between the TDF node 11 and the PCRF node 7. A Gx interface 14 is to be established between the PCEF node 10 and the PCRF node 7 for communicating between the PCEF node 10 and the PCRF node 7.

Figure 2:
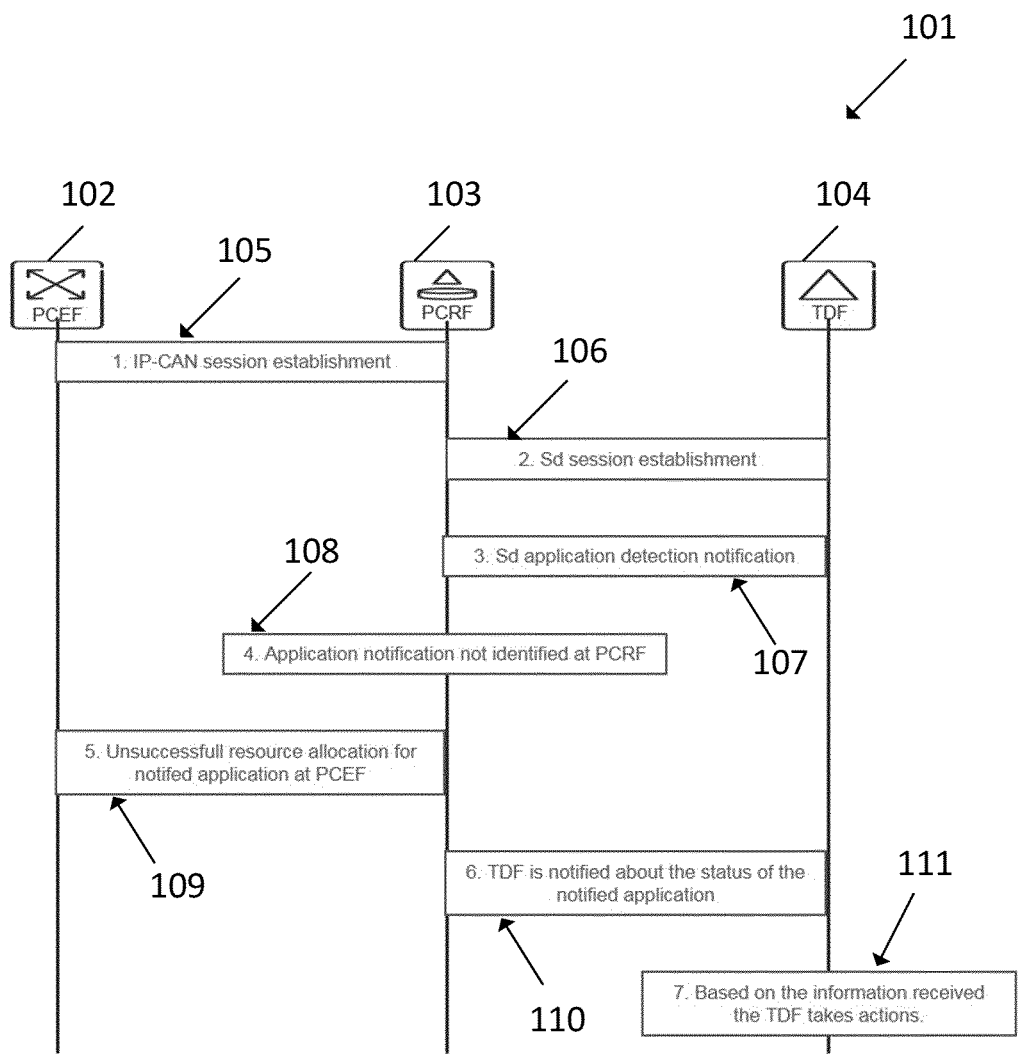
FIG. 2 discloses a high level overview flow chart of an example of the method according to the present disclosure.

FIG. 2 discloses a high level overview flow chart 101 of an example of the method according to the present disclosure.

In accordance with an example of the present disclosure, a PCEF node 102, a PCRF node 103 and a TDF node 104 are involved in the communication.

First, an IP-CAN session establishment procedure 105 may be initiated by the PCEF node 102 towards the PCRF node 103, over the Gx interface, for providing a communication channel between the PCEF node 102 and the PCRF node 103 such that these nodes are able to communicate with each other.

An Sd session establishment procedure 106 may similarly be established between the PCRF node 103 and the TDF node 104, over the Sd interface, for providing a communication channel between the PCRF node 103 and the TDF node 104 such that these nodes are able to communicate with each other.

It is noted that, in a solicited application reporting mode, i.e. a subscription mode, the PCRF node may initiate the session establishment towards the TDF node. In an unsolicited mode, i.e. without a subscription, the TDF node may initiate the session establishment towards the PCEF node.

The PCRF node may receive 107, from the TDF node 104, a notification that the TDF node has detected a particular Over The Top, OTT, application. The TDF node 104 may have detected such an OTT application using Deep Packet Inspection, DPI, techniques.

Subsequently, the PCRF node 103 may determine that resources for the detected particular OTT application can not be successfully allocated. Such a step may entail that the PCRF is not able to identify 108 the detected particular OTT application at the PCRF node 103. Alternatively, the PCRF node 103 may be unable 108 to generate PCC rules for the detected particular OTT application, which PCC rules are to be provided to the PCEF node 102 comprised by the telecommunication network.

Another option is that the PCRF node 103 is able to identify 108 the particular OTT application and is able to generate the PCC rules for the detected OTT application, but an issue arises at the PCEF node 102. That is, the PCEF node 102 may receive the PCC rules from the PCRF node 103 but the PCEF node 102 may be unable 109 to allocate a resource for the OTT application. In such a case, the PCEF node 102 may transmit a notification of a release or unsuccessful resource allocation for the OTT application by the PCEF node 102, to the PCRF node 103

Finally, the TDF is notified 110, by the PCRF node 103, that the resources for the detected particular OTT application can not be successfully allocated. In that case, the TDF node 104 may take corresponding actions, for example retransmit the notification to the PCRF node 103 that an OTT application has been detected.

Figure 3:
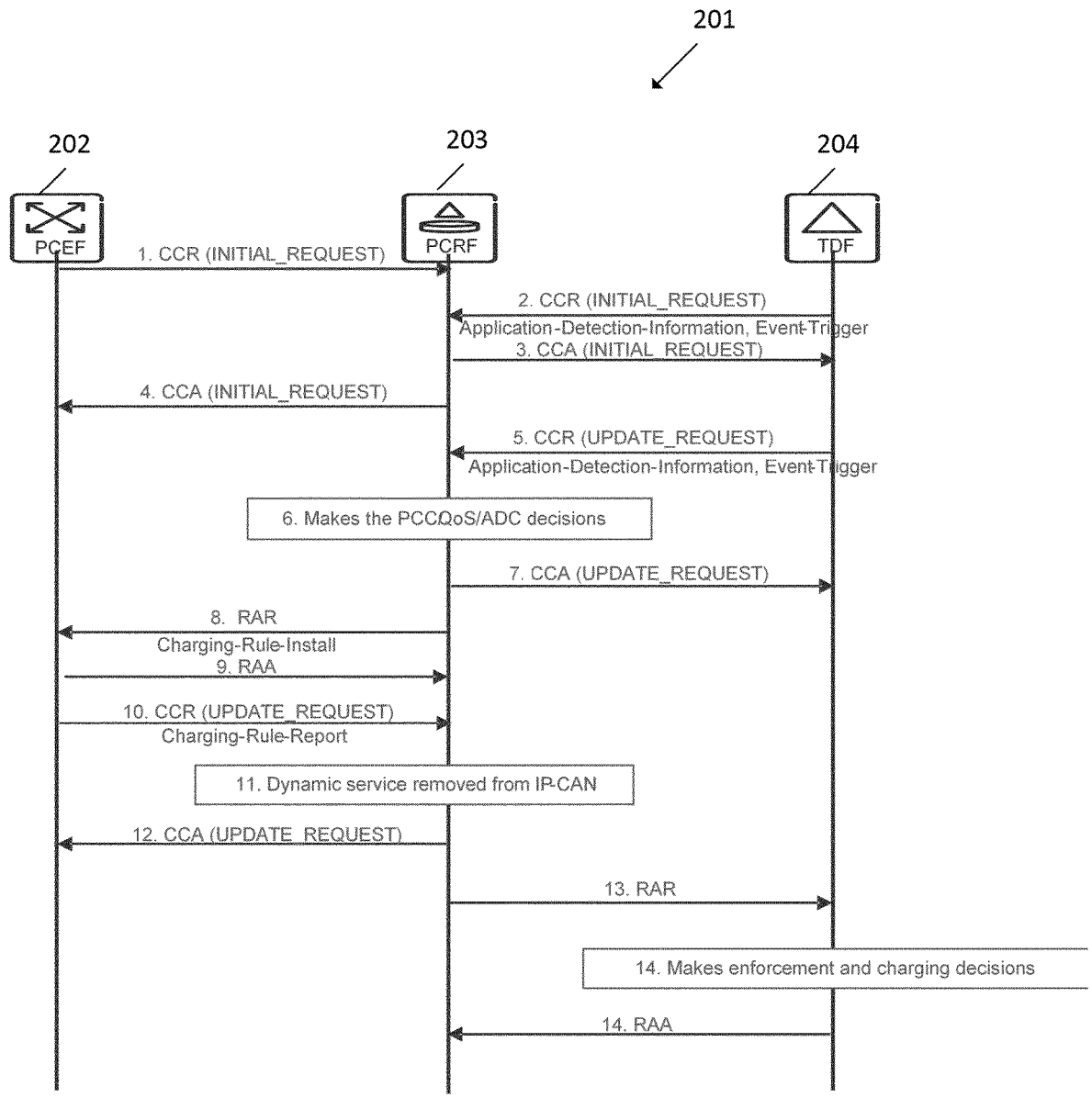
FIG. 3 discloses a flow chart illustrating a further example of the method according to the present disclosure.

FIG. 3 discloses a flow chart 201 illustrating a further example of the method according to the present disclosure.

Here, the method involves the PCEF node 202, the PCRF node 203 and the TDF node 204 and is explained in more detail here below. Each step in the flow chart is indicated with a particular reference numeral and will be adhered to in the text below.

1. The PCEF node 202 informs the PCRF node 203 of, i.e. it initiates, the IP-CAN Session establishment. The PCEF starts a new Gx session by sending a Credit-Control-Request message, CCR, to the PCRF node 203 using the CC-Request-Type Attribute Value Pairs, AVP, set to the value INITIAL_REQUEST.

The PCEF node 202 may provide User Equipment, UE, identity information, PDN identifier, the UE Ipv4 address and/or UE Ipv6 prefix and, if available, the Public Data Network, PDN, connection identifier, IP-CAN type, Radio Access Technology, RAT, type and/or the default charging method and additional charging parameters. The PCEF node 202 may further provide, when available, the Default-EPS-Bearer-QoS and the Access Point Name, APN, Aggregate Maximum Bit Rate, APN-AMBR to the PCRF node 203. The PCEF node 202 may provide the applicable TDF routing information in TDF-Information AVP.

2. For unsolicited application reporting the TDF node 204 may initiate the Sd Session Establishment by sending a CCR to the PCRF node 203 using the CC-Request-Type AVP set to the value INITIAL_REQUEST, the TDF node 204 can subscribe to application notification status in the CCR-I.

3. The PCRF node 203 acknowledges the Sd session to the TDF node 204 using a Credit Check Answer, CCA, message.

4. The PCRF node 203 selects or generates PCC Rule(s) to be installed. The PCRF node 203 may also make a policy decision by deriving an authorized QoS and by deciding whether service flows described in the PCC Rules are to be enabled or disabled. The PCRF node 203 provisions the PCC Rules to the PCEF node 202 using CCA. The PCRF node 203 may provide authorized QoS including the APN-AMBR and the Default-EPS-Bearer-QoS.

5. The TDF node 204 may report the information regarding the detected application's traffic in a CCR-U command including the Application-Detection-Information AVP. The Flow-Information and Application-Instance-Identifier AVPs may be included into Application-Detection-Information AVP for APPLICATION_START events. The TDF can also subscribe/unsubscribe to application notification status during the application detection notification in the CCR-U.

6. The notification received over Sd may provoke a reauthorization of Sd and Gx sessions. The PCRF node 203 can initiate dedicated bearers based on the information received over Sd within the Application-Detection-Information AVP. The PCRF node 203 may, for example, install new PCC rules to the PCEF node based on the information received over the Sd interface. The PCRF node 203 may identify the application that the notification refers to and qualify it by creating a PCC-Rule to be installed in the PCEF node 202.

7. The PCRF node 203 acknowledges the Sd session notification by sending a Diameter CCA with CC-Request-Type set to UPDATE-REQUEST to the TDF node 204. The TDF node 204 may store the information received in the Diameter CCA-U and activate/deactivate the ADC rules according the new ADC decisions provided.

8. The PCRF node 203 may send a Diameter RAR to the PCEF node 202 by including the QoS-Information and/or Charging-Rule-Install. At this point the application reported by the TDF node 204 may receive dedicated resources in the PCEF node 202.

9. The PCEF node 202 acknowledges to the PCRF node 203 by sending a Diameter RA-Answer to inform a Service-Aware Policy Controller, SAPC, about the outcome of the actions related to the decisions.

10. The PCEF node 202 may report to the PCRF node 203 the release or the unsuccessful allocation of dedicated resources for the application reported by the TDF node 204 in a CCR-U command including the Charging-Rule-Report AVP.

11. The notification received over Gx provokes a reauthorization of Sd and Gx sessions. The PCRF node 203 may remove the reported service from the list of services running in the IP-CAN. The PCRF node 203 may further notify to the TDF node 204 about the outcome of the dedicated bearer establishment of the application reported by the TDF node 204.

12. The PCRF node 203 acknowledges this Gx session notification by sending a Diameter CCA with CC-Request-Type set to UPDATE-REQUEST to the PCEF node 202.

13. The PCRF node 203 sends a Diameter RAR to the TDF node 204 in order to notify about the outcome of the dedicated resource allocation in the PCEF node 202 for the previously reported application by the TDF node 204.

14. The TDF node 204 acknowledges to the PCRF node 203 by sending a Diameter RA-Answer to inform the SAPC about the outcome of the actions related to the decisions.

Figure 4:
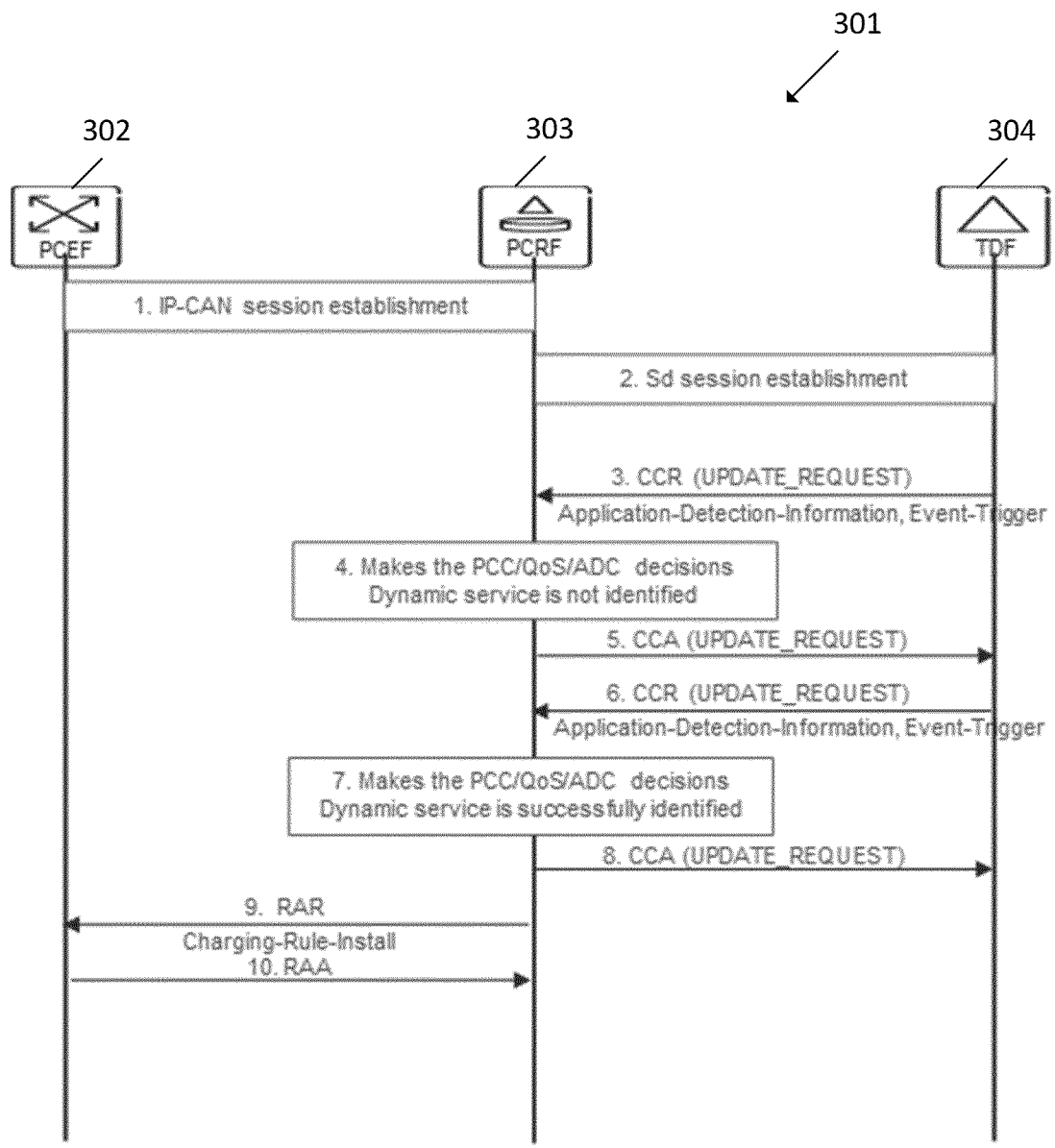
FIG. 4 discloses a flow chart illustrating another example of the method according to the present disclosure.

FIG. 4 discloses a flow chart 301 illustrating another example of the method according to the present disclosure.

Here, the method involves the PCEF node 302, the PCRF node 303 and the TDF node 304 and is explained in more detail here below. Each step in the flow chart is indicated with a particular reference numeral and will be adhered to in the text below.

1. The PCEF node 302 may inform the PCRF node 303 of the IP-CAN Session establishment. The PCEF node 302 may start a new Gx session by sending a CCR to the PCRF node 303 using the CC-Request-Type AVP set to the value INITIAL_REQUEST.

The PCEF node 302 may provide UE identity information, PDN identifier, the UE Ipv4 address and/or UE Ipv6 prefix and, if available, the PDN connection identifier, IP-CAN type, RAT type and/or the default charging method and additional charging parameters. The PCEF node 302 may provide, when available, the Default-EPS-Bearer-QoS and the APN-AMBR to the PCRF node 303. The PCEF node 302 may provide the applicable TDF routing information in TDF-Information AVP. The PCRF node 303 may select or generate PCC Rule(s) to be installed. The PCRF node 303 may also make a policy decision by deriving an authorized QoS and by deciding whether service flows described in the PCC Rules are to be enabled or disabled. The PCRF node 303 may provision the PCC Rules to the PCEF using CCA. The PCRF may provide authorized QoS including the APN-AMBR and the Default-EPS-Bearer-QoS.

2. When user profile configuration indicates that Application Detection and Control function is enabled, the PCRF node 303 may make the policy decision for the application detection and control. The PCRF node 303 may select the applicable ADC rules for the solicited application reporting with a TDF node 304.

The PCRF may initiate a TDF Session Establishment procedure with the selected TDF node 304 and may provide ADC Rules and event-triggers. The TDF node 304 replies to the PCRF node 303, the TDF node 304 may subscribe to application notification status. On the other side, for unsolicited application reporting the TDF node 304 may initiate the Sd Session Establishment by sending a CCR to the PCRF node 303 using the CC-Request-Type AVP set to the value INITIAL_REQUEST. The TDF node 304 can subscribe to application notification status. The PCRF node 303 may acknowledge the Sd session to the TDF node 304 using CCA.

3. The TDF node 304 may report the information regarding the detected application's traffic in a CCR-U command including the Application-Detection-Information AVP. The Flow-Information and Application-Instance-Identifier AVPs are included into Application-Detection-Information AVP for APPLICATION_START events. The TDF node 304 can subscribe/unsubscribe to application notification status.

4. The notification received over Sd may provoke a reauthorization of Sd and Gx sessions. The PCRF node 303 can initiate dedicated bearers based on the information received over Sd within the Application-Detection-Information AVP. The PCRF node 303 may identify the application that the notification refers to and qualify it by creating a PCC-Rule to be installed in the PCEF node 302. In this scenario, the PCRF node 303 cannot identify the application reported or is not able to generate the corresponding PCC-Rule to be installed in the PCEF node 302.

5. The PCRF node 303 may acknowledge the Sd session notification by sending a Diameter CCA with CC-Request-Type set to UPDATE-REQUEST to the TDF node 304. New ADC-Rule-Install/ADC-Rule-Remove AVPs in case the Sd session needs to be updated as a result of policy evaluation based on the information received. The TDF node 304 may store the information received in the Diameter CCA-U and activate/deactivate the ADC rules according the new ADC decisions provided. If during the identification and qualification processes, in the PCRF node 303, any issue is detected, this circumstance is reported to the TDF node 303.

6. The TDF node 304 may fix the erroneous/missing information at application level in the Application-Detection-Information AVP and retry the notification about the detected application's traffic in a CCR-U command including the modified Application-Detection-Information AVP.

7. The notification received over Sd provokes a reauthorization of Sd and Gx sessions. The PCRF node 303 can initiate dedicated bearers based on the information received over Sd within the Application-Detection-Information AVP. The PCRF node 303 may identify the application that the notification refers to and qualify it by creating a PCC-Rule to be installed in the PCEF node 302.

8. The PCRF node 303 may acknowledge the Sd session notification by sending a Diameter CCA with CC-Request-Type set to UPDATE-REQUEST to the TDF node 304. New ADC-Rule-Install/ADC-Rule-Remove AVPs in case the Sd session needs to be updated as a result of policy evaluation based on the information received. The TDF node 304 may store the information received in the Diameter CCA-U and activate/deactivate the ADC rules according the new ADC decisions provided.

9. The PCRF node 303 sends a Diameter RAR to the PCEF node 302 by including the QoS-Information and/or Charging-Rule-Install. At this point the application reported by the TDF node 304 receive dedicated resources in the PCEF node 302.

10. The PCEF node 302 may acknowledge to the PCRF node 303 by sending a Diameter RA-Answer, to inform the SAPC about the outcome of the actions related to the decisions.

Figure 5:
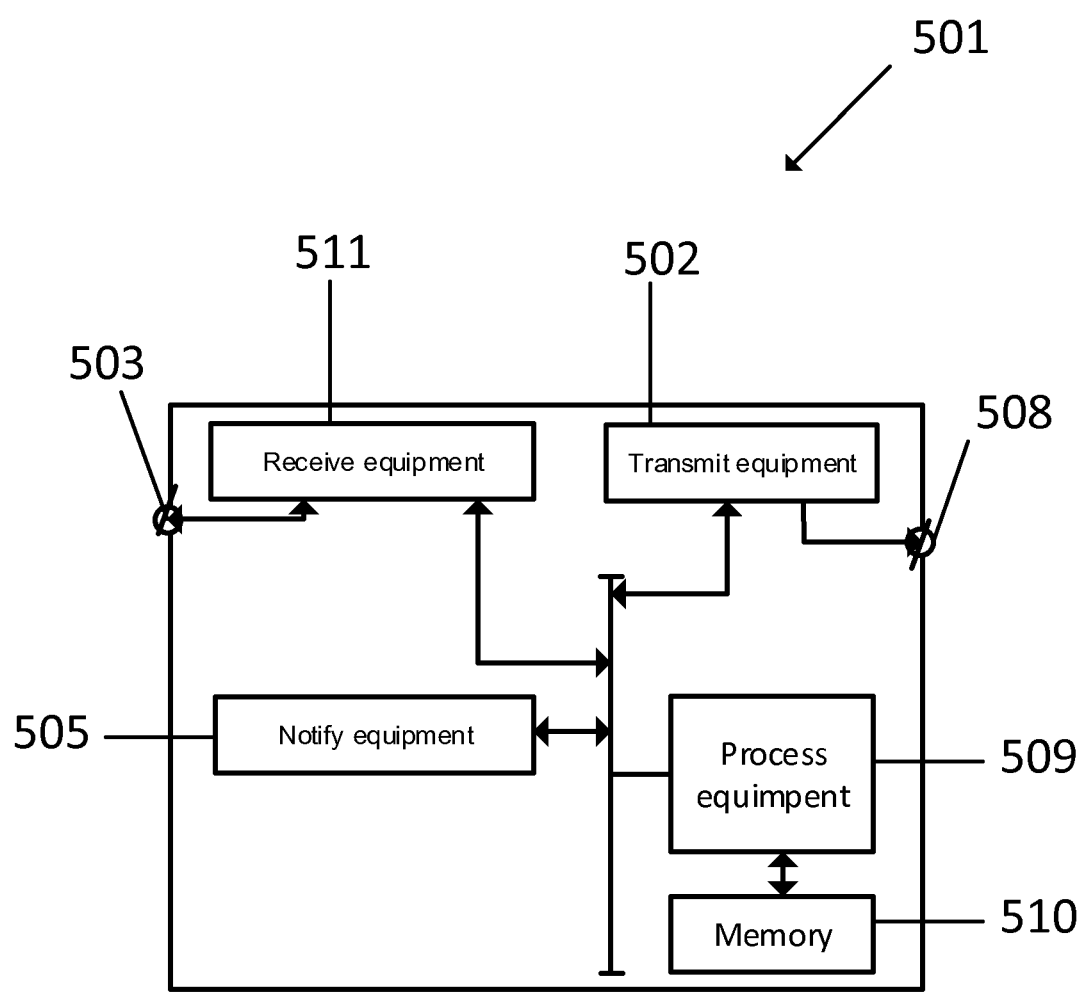
FIG. 5 discloses a schematic view of a PCRF node in accordance with an example of the present disclosure.

FIG. 5 discloses a schematic view of a PCRF node 501 in accordance with an example of the present disclosure.

The PCRF node 501 is arranged for enabling a standalone Traffic Detection Function, TDF, node in a telecommunication network to act on unsuccessful resource allocation for an over-the-top, OTT, application detected by said TDF node.

The PCRF node 501 comprise receive equipment, or a receiving module, 511 connected to a receiving terminal 503 for receiving messages/packets. The PCRF node 501 further comprises transmit equipment, or a transmitting module 502, connected to a transmit terminal 508, for transmitting messages/packets.

The receive equipment 511 is, for example, arranged for receiving a notification that the TDF node has detected a particular OTT application.

The PCRF node 501 further comprises process equipment 509 arranged for determining that resources for said detected particular OTT application can not be successfully allocated, and comprises notify equipment 505 arranged for notifying said TDF node that said resources for said detected particular OTT application can not be successfully allocated.

One of the advantages of the present disclosure is that the presented method allows an operator to notify the TDF node about the outcome of the notifications towards the PCRF node over Sd regarding OTT initiation/termination. If TDF node is aware about the notification status and the QoS provided to the OTT application can report new notification to the PCRF node including additional information or do enforcement accordingly.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method performed by a Policy and Charging Rules Function (PCRF) node of a telecommunication network, the method comprising:
   establishing a session with a standalone Traffic Detection (TDF) node, for reporting by the standalone TDF node to the PCRF node of detection of a particular Over-the-Top (OTT) application and reporting by the PCRF node to the TDF node of unsuccessful resource allocation for the OTT application to the standalone TDF node;
   receiving a notification from the standalone TDF node of the telecommunication network that the standalone TDF node has detected the particular OTT application;
   determining that resources for the particular OTT application cannot be allocated; and
   notifying the standalone TDF node that resources for the particular OTT application cannot be allocated.

2. The method according to claim 1, wherein determining that resources for the particular OTT application cannot be allocated comprises any of:
   the PCRF node being unable to identify the particular OTT application; or
   the PCRF node being unable to generate Policy Control and Charging (PCC) rules for the particular OTT application, which PCC rules are to be provided to a Policy and Charging Enforcement Function (PCEF) node of the telecommunication network.

3. The method according to claim 1, wherein determining that resources for the particular OTT application cannot be allocated comprises:
   generating Policy Control and Charging (PCC) rules for the particular OTT application;
   providing the PCC rules to a Policy and Charging Enforcement Function (PCEF) node of the telecommunication network; and
   receiving a notification from the PCEF node of a release or unsuccessful resource allocation for the particular OTT application by the PCEF node.

4. The method according to claim 1, wherein the method further comprises:
   the PCRF node receiving a subscription request from the standalone TDF node, requesting notification with respect to a status of resource allocation for the particular OTT application;
   wherein the step of notifying is performed by the PCRF node in response to the subscription request.

5. The method according to claim 1, wherein the method further comprises, as an initial step of the method:
   the PCRF node engaging an Internet Protocol Connectivity Access Network (IP-CAN) Bearer Establishment procedure with a Policy and Charging Enforcement Function (PCEF) node of the telecommunication network.

6. A Policy and Charging Rules Function (PCRF) node configured for operation in a telecommunication network, the PCRF node comprising:
   receiver circuitry;
   transmitter circuitry; and
   processing circuitry configured to:
      initiate a Traffic Detection Function (TDF) session establishment procedure for reporting by a standalone TDF node of the telecommunication network to the PCRF node of detection of a particular Over-the-Top (OTT) application and for reporting by the PCRF node to the standalone TDF node of unsuccessful resource allocation for the particular OTT application;
      receive, via the receiver circuitry, a notification that the standalone TDF node has detected the particular OTT application;
      determine that resources for the particular OTT application cannot be allocated; and
      notify the TDF node that resources for the particular OTT application cannot be allocated.

7. The PCRF node according to claim 6, wherein the processing circuitry is configured to determine that resources for the particular OTT application cannot be allocated in response to the PCRF node:

being unable to identify the particular OTT application; or being unable to generate Policy Control and Charging (PCC) rules for the particular OTT application, where the PCC rules are to be provided to a Policy and Charging Enforcement Function (PCEF) node of the telecommunication network.

8. The PCRF node according to claim 6, wherein the processing circuitry is configured to:

generate Policy Control and Charging (PCC) rules for the particular OTT application;

provide the PCC rules to a Policy and Charging Enforcement Function (PCEF) node of the telecommunication network; and wherein the processing circuitry is configured to determine that resources for the particular OTT application cannot be allocated in response to the PCRF node receiving a notification from said PCEF node, indicating a release or unsuccessful resource allocation for the OTT application by the PCEF node.

9. The PCRF node according to claim 6, wherein the processing circuitry is further configured to receive a subscription request from the standalone TDF node, via the receiver circuitry, the subscription request requesting that the TDF node be notified with respect to a status of resource allocation for the particular OTT application, and wherein the processing circuitry is configured to notify the standalone TDF node that resources for the particular OTT application cannot be allocated in dependence on having received the subscription request.

10. The PCRF node according to claim 6, wherein, as initial operations performed before the receive, determine, and notify operations, the processing circuitry is configured to:

engage in an Internet Protocol Connectivity Access Network (IP-CAN) Bearer Establishment procedure with a Policy and Charging Enforcement Function (PCEF) node of the telecommunication network.

11. A method performed by a standalone Traffic Detection Function (TDF) node of a telecommunication network, the method comprising:

establishing a session with a Policy and Charging Rules Function (PCRF) node, for reporting by the standalone TDF node to the PCRF node of detection of a particular Over-the-Top (OTT) application and reporting by the PCRF node to the standalone TDF node of unsuccessful resource allocation for the particular OTT application;

transmitting a notification to the PCRF node of the telecommunication network, indicating that the standalone TDF node has detected a particular Over-the-Top (OTT) application;

receiving a return notification from the PCRF node, indicating that resources for the particular OTT application cannot be allocated; and acting on the unsuccessful allocation, as indicated by the return notification, by retransmitting the notification from the standalone TDF node to the PCRF node.

12. A standalone Traffic Detection Function (TDF) node configured for operation in a telecommunication network, the TDF node comprising:

receiver circuitry;

transmitter circuitry; and processing circuitry configured to:

establish a session with a Policy and Charging Rules Function (PCRF) node, for reporting by the standalone TDF node to the PCRF node of detection of a particular Over-the-Top (OTT) application and reporting by the PCRF node to the standalone TDF node of unsuccessful resource allocation for the particular OTT application;

transmit, via the transmitter circuitry, a notification to the PCRF node notification indicating that the standalone TDF node has detected the particular OTT application;

receive, via the receiver circuitry, a return notification that resources cannot be allocated for the particular OTT application; and act on the unsuccessful allocation, as indicated by the return notification, by retransmitting the notification from the standalone TDF node to the PCRF node.

* * * * *